(12) United States Patent
Chu et al.

(10) Patent No.: US 12,492,679 B2
(45) Date of Patent: Dec. 9, 2025

(54) METHOD, APPARATUS, DEVICE AND SYSTEM FOR CONTROLLING AN OSCILLATION DAMPING CAUSED BY A SERIES COMPENSATION FOR A WIND POWER PLANT

(71) Applicant: VERTIV NEW ENERGY CO., LTD., Shaanxi (CN)

(72) Inventors: Xiaogang Chu, Shaanxi (CN); Tao Zhang, Shaanxi (CN); Yufan Xi, Shaanxi (CN)

(73) Assignee: VERTIV NEW ENERGY CO., LTD., Shaanxi (CN)

( * ) Notice: Subject to any disclaimer, the term of this patent is extended or adjusted under 35 U.S.C. 154(b) by 0 days.

(21) Appl. No.: 18/533,037

(22) Filed: Dec. 7, 2023

(65) Prior Publication Data

US 2024/0200533 A1 Jun. 20, 2024

(30) Foreign Application Priority Data

Dec. 9, 2022 (CN) .......................... 202211585968.6

(51) Int. Cl.
F03D 7/04 (2006.01)
(52) U.S. Cl.
CPC .................... F03D 7/044 (2013.01)
(58) Field of Classification Search
CPC ....................................................... F03D 7/044
See application file for complete search history.

(56) References Cited

U.S. PATENT DOCUMENTS 4,355,241 A * 10/1982 Hingorani ............... H02J 3/241
323/217
4,724,333 A * 2/1988 Hedin ..................... H02J 3/241
322/58

(Continued)

FOREIGN PATENT DOCUMENTS

CN 112838589 A 5/2021
CN 115021243 A * 9/2022 .............. H02J 3/002

(Continued)

OTHER PUBLICATIONS

Extended European Search Report regarding Application No. 23214255.4, dated Jun. 21, 2024.

Primary Examiner — Oluseye Iwarere
Assistant Examiner — Thomas K Quigley
(74) Attorney, Agent, or Firm — Harness, Dickey & Pierce, P.L.C.

(57) ABSTRACT

A method, an apparatus, a device and a system for controlling an oscillation damping caused by a series compensation for a wind power plant are provided. The method includes: extracting, a first dynamic small signal from first relevant parameters causing power oscillation, inputting the first dynamic small signal to a PID controller, and feeding an output control parameter from the PID to a rotor voltage controller as a first feedforward term; obtaining, according to second relevant parameters causing sub-synchronous oscillation, a virtual voltage, and feeding into a rotor voltage controller as a second feedforward term; and extracting a third dynamic small signal from third relevant parameters causing the oscillation of a rotor current loop and then performing phase and amplitude compensations on the third dynamic small signal, and feeding the output of the POD controller into the given position of a rotor current controller as a third feedforward term.

15 Claims, 6 Drawing Sheets

(56) References Cited

U.S. PATENT DOCUMENTS

| | | | |
|---|---|---|---|
| 7,511,385 B2* | 3/2009 | Jones | H02M 5/4585 |
| | | | 290/43 |
| 8,928,293 B1* | 1/2015 | Rozman | H02P 9/14 |
| | | | 322/29 |
| 9,041,234 B2* | 5/2015 | Lu | H02H 7/06 |
| | | | 290/44 |
| 2015/0292484 A1* | 10/2015 | Haj-Maharsi | F03D 15/10 |
| | | | 290/44 |
| 2015/0381089 A1* | 12/2015 | Tarnowski | H02J 3/32 |
| | | | 290/44 |
| 2018/0159453 A1 | 6/2018 | Andersen et al. | |
| 2022/0052632 A1 | 2/2022 | Bueno Peña et al. | |
| 2024/0055860 A1* | 2/2024 | Moriano Martín | F03D 7/0272 |

FOREIGN PATENT DOCUMENTS

| | | | | |
|---|---|---|---|---|
| CN | 119254063 A | * | 1/2025 | H02P 27/08 |
| EP | 3861631 B1 | | 7/2022 | |

* cited by examiner

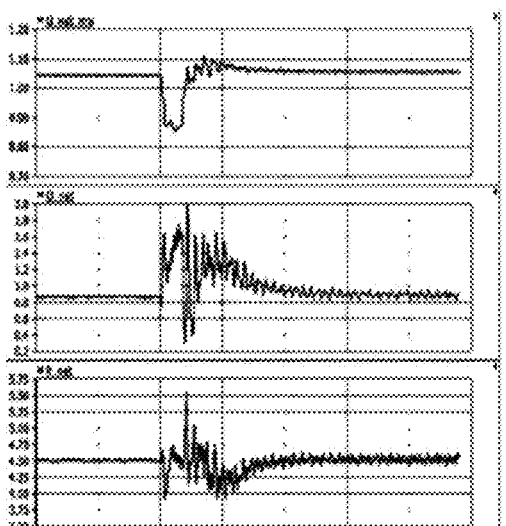
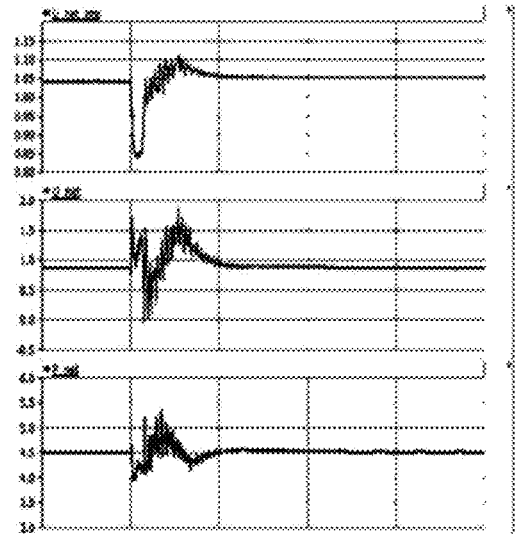

Waveforms of sub-synchronous suppression according to the conventional control method Waveforms of sub-synchronous suppression according to the control method of present disclosure

Figure 11

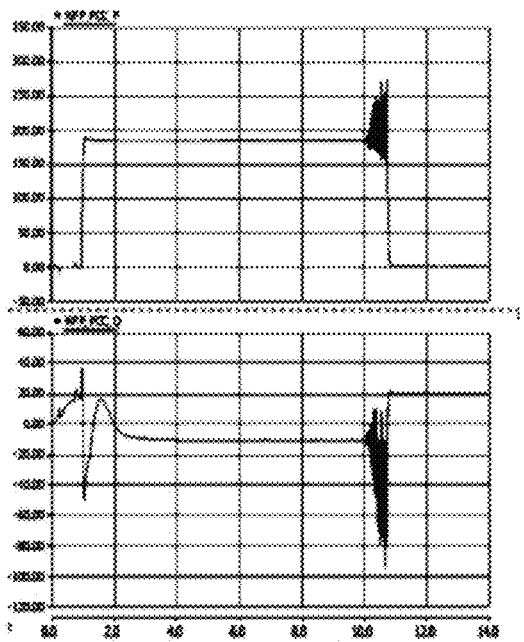
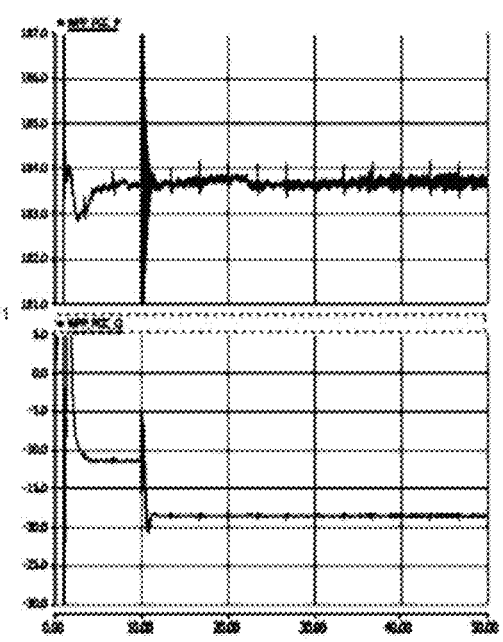

For a conventional method, in a case of a series compensation degree of 85%, the PCC point power divergent generator set is off-grid For a method according to the present disclosure, in a case of a series compensation degree of 85%, the PCC point oscillation convergence generator set continues to operate

METHOD, APPARATUS, DEVICE AND SYSTEM FOR CONTROLLING AN OSCILLATION DAMPING CAUSED BY A SERIES COMPENSATION FOR A WIND POWER PLANT

CROSS-REFERENCE TO RELATED APPLICATION

This application claims priority to Chinese Patent Application No. 202211585968.6 filed on Dec. 9, 2022 and entitled "METHOD, APPARATUS, DEVICE AND STSTEM FOR CONTROLLING AN OSCILLATION DAMPING CAUSED BY A SERIES COMPENSATION FOR A WIND POWER PLANT", the disclosure of which is incorporated herein by reference in its entirety.

FIELD

The present disclosure relates to the technical field of wind power generation, and in particular to a method, an apparatus, a device and s system for controlling an oscillation damping caused by a series compensation for a wind power plant.

BACKGROUND

A new energy wind power plant is usually located at an end of a power grid, and a series compensation apparatus is required to improve transmission capacity of the power grid. There is a resonance frequency point between the capacitive reactance and the inductive reactance of a power grid in series compensation. The grid-connected mode of a doubly-fed generator is that the generator is directly connected to the power grid. The value of an equivalent resistance of a rotor of the doubly-fed generator is related to a slip frequency. In a positive sequence power grid, a sub-synchronous slip frequency calculated based on a rotation speed of the rotor and a sub-synchronous resonance frequency is negative, so that the equivalent resistance of the rotor is negative. In a case that a sum of a resistance of the power grid and the equivalent resistances of a stator and a rotor is negative, the series compensation grid will cause the voltage resonance oscillation of the power grid at the resonance frequency point due to insufficient damping, which results in an unstable operation of the doubly-fed generator, thereby causing power oscillation of the generator, and even causing the control failure to occur off-grid.

The doubly-fed generator is directly coupled to the power grid, and the oscillation of the power grid cause sub-synchronous oscillation and super synchronous oscillation. A stator and a rotor are coupled and induced with each other, resulting in oscillation at various resonance frequencies in a stator voltage, a stator current, a rotor voltage and a rotor current. Sub-synchronous power grid makes the conventional control method of a doubly-fed generator no longer suitable. An inappropriate controller results in a mechanical torsional vibration and divergent oscillation of a wind power generator set, which expands a fault range and harms the stable operation of the power grid, thereby resulting in the voltage of a power grid, the frequency of a power grid, the active power and the reactive power of a wind power plant non-convergent, such that characteristics of divergence of under-damping oscillation are shown.

Conventional methods for suppressing sub-synchronous oscillation include: a method for sub-synchronous voltage feedforward control compensation, a method used to control the damping for an excitation current, and a method for stator current virtual resistance feedforward control. The problem of the conventional method is that, with the method in a feedforward manner, a sub-synchronous resonance current cannot be accurately controlled. In particular, for multi-resonant frequency components, a method for detecting and identifying voltage and current can be complex and difficult, and the coupling of the control is complex, and it is required to detect frequency information of all sub-synchronous voltages and currents. A required controller for controlling sub-synchronous oscillation has a complex structure, and the corresponding sub-synchronous controller selection and control parameter design may be complex, which is not applicable to weak power grids with different series compensation degrees.

SUMMARY

The present disclosure aims to provide a method, an apparatus, a device and s system for controlling an oscillation damping caused by a series compensation for a wind power plant to solve the problems in the conventional technology that frequency information of all sub-synchronous voltages and currents is required to be detected, the selection for corresponding sub-synchronous controller and the design of control parameters are complicated, and the adaptability to different series compensation degrees of weak power grids is poor.

In a first aspect, a method for controlling an oscillation damping caused by a series compensation for a wind power plant is provided according to an embodiment of the present disclosure. The method comprises: extracting, by a filter, a first dynamic small signal from first relevant parameters causing power oscillation during the operation of a doubly-fed generator, inputting the first dynamic small signal to a proportional-integral-differential (PID) negative feedback controller, and feeding an output control parameter from the PID negative feedback controller into a rotor voltage controller as a first feedforward term; obtaining, from second relevant parameters causing sub-synchronous oscillation during the operation of the doubly-fed generator, a virtual voltage corresponding to a second dynamic small signal, and feeding the virtual voltage into the rotor voltage controller as a second feedforward term; using a power oscillation damping (POD) controller, extracting a third dynamic small signal from third relevant parameters causing the oscillation in a rotor current loop during the operation of the doubly-fed generator and performing phase and amplitude compensations on the third dynamic small signal, and feeding an output of the POD controller into a given position of a rotor current controller as a third feedforward term.

In one or more embodiments, the method further includes: acquiring a sub-synchronous slip voltage and a sub-synchronous slip frequency during the operation of the doubly-fed generator; multiplying the sub-synchronous slip voltage, the sub-synchronous slip frequency and a stator-rotor turn ratio to obtain a fourth feedforward term; and feeding the fourth feedforward term into an output terminal of the rotor current controller, wherein the output terminal of the rotor current controller is connected to the rotor voltage controller.

In one or more embodiments, the method further includes: obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis; and inputting the rotor voltage to a phase locked loop (PLL), performing phase and amplitude compensations on a power component of the first dynamic small signal, multiplying the power component subjected to the phase and amplitude compensations by a gain coefficient and feeding into an angular frequency integrator of the PLL, and calculating corresponding grid voltage angle by using the PLL.

In one or more embodiments, the second relevant parameters include a rotor current or a stator current.

In one or more embodiments, the second relevant parameters include the rotor current, and the obtaining the virtual voltage corresponding to the second dynamic small signal from the second relevant parameters causing sub-synchronous oscillation during the operation of the doubly-fed generator and feeding the virtual voltage into the rotor voltage controller as the second feedforward term comprises: extracting the second dynamic small signal from the rotor current by the POD controller, performing phase compensation on the second dynamic small signal and multiplying by a gain coefficient to obtain the virtual voltage corresponding to the second dynamic small signal, and feeding the obtained virtual voltage into the rotor voltage controller as the second feedforward term; or multiplying the rotor current by a sum of a virtual resistance and a virtual impedance to obtain the virtual voltage corresponding to the second dynamic small signal, and feeding the obtained virtual voltage into an output terminal of the rotor current controller as the second feedforward term, wherein the output terminal of the rotor current controller is connected to the rotor voltage controller.

In one or more embodiments, the method further includes: obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis; inputting a stator active power and a reference active power to a power controller, and processing by an inertia device and a filter the obtained corresponding angular frequency change and feeding into the power controller through a negative feedback loop; and inputting the rotor voltage to a phase-locked loop (PLL), feeding an output of the power controller to an angular frequency integrator of the PLL, and calculating, by the PLL, a corresponding voltage angle of a power grid.

In one or more embodiments, the filter is a washout filter and a transfer function of the washout filter is expressed as:

$$\frac{ST_w}{1+ST_w}$$

wherein S represents a differential operator, and Tw represents a predetermined time constant.

In one or more embodiments, the first relevant parameters comprise a stator active power $P_{fb}$ for a d-axis and a stator reactive power $Q_{fb}$ for a q-axis, and the rotor voltage controller comprises a rotor voltage controller for the d-axis and a rotor voltage controller for the q-axis.

In one or more embodiments, the third relevant parameters comprise a rotor positive sequence voltage for a d-axis and a rotor positive sequence voltage for a q-axis, and the rotor voltage controller comprises a rotor voltage controller for the d-axis and a rotor voltage controller for the q-axis.

In one or more embodiments, the POD controller comprises a gain unit with a gain coefficient K, a washout filter, and at least one phase compensator.

In a second aspect, an apparatus for controlling an oscillation damping caused by a series compensation for a wind power plant is provided according to an embodiment of the present disclosure. The apparatus includes: a power oscillation suppression module, configured to extract, by a filter, a first dynamic small signal from first relevant parameters causing power oscillation during the operation of a doubly-fed generator, input the first dynamic small signal to a proportional-integral-differential (PID) negative feedback controller, and feed an output control parameter from the PID negative feedback controller into a rotor voltage controller as a first feedforward term; a sub-synchronous oscillation suppression module, configured to obtain, from second relevant parameters causing sub-synchronous oscillation during the operation of the doubly-fed generator, a virtual voltage corresponding to a second dynamic small signal, and feed the virtual voltage into the rotor voltage controller as a second feedforward term; and a current oscillation suppression module, configured to extract a third dynamic small signal from third relevant parameters causing the oscillation in a rotor current loop during the operation of the doubly-fed generator and perform phase and amplitude compensations on the third dynamic small signal, and feed an output of the POD controller into a given position of a rotor current controller as a third feedforward term.

In a third aspect, a device for controlling an oscillation damping caused by a series compensation for a wind power plant is further provided according to an embodiment of the present disclosure. The device includes at least one processor; and a memory connected in communication with the at least one processor, wherein the memory stores instructions executable by the at least one processor, and the instructions, when being executed by the at least one processor, cause the at least one processor to execute the method according to the first aspect.

In a fourth aspect, a computer storage medium is further provided according to an embodiment of the present disclosure. The computer storage medium has a computer program stored thereon, wherein the computer program, when being executed, causes a computer to implement the method according to according to the first aspect.

In a fifth aspect, a wind power generation system is further provided according to an embodiment of the present disclosure. The wind power generation system includes the apparatus for controlling an oscillation damping caused by a series compensation for a wind power plant according to the second aspect, and a doubly-fed generator configured to operate under control of the apparatus for controlling an oscillation damping caused by a series compensation for a wind power plant.

In the embodiments of the present disclosure, the rotor voltage is controlled by the filters and the POD controller in a feedforward manner and a negative feedback manner to suppress power oscillation, sub-synchronous oscillation and rotor current loop oscillation. In this way, it is solved the following problems in the conventional technology that an effect of suppressing sub-synchronous oscillation is poor, frequency information of a large number of sub-synchronous voltages and currents is required to be detected, extraction and calculation are complex, a required controller for controlling sub-synchronous oscillation has a complex structure and parameters used for control are complex, and the conventional methods are not applicable to weak power grids connected to different series compensation apparatuses with different series compensation degrees.

Other features and advantages of the present disclosure will be described in the following specification, and will become apparent in part from the specification, or will be understood by implementing the present disclosure. The purpose and other advantages of the present disclosure can be realized and obtained through the specification, the claims, and the structure specially pointed out in the drawings.

BRIEF DESCRIPTION OF THE DRAWINGS

In order to describe the technical solutions in the embodiments of the present disclosure more clearly, the drawings to be used in the description of the embodiments of the present disclosure are briefly described hereinafter. It is apparent that the drawings described below are merely used for describing the embodiments of the present disclosure, and those skilled in the art may obtain other drawings according to these drawings without any creative effort.

FIG. 11 is a schematic diagram of the sub-synchronization suppression waveforms corresponding to the related arts and the control method of the present disclosure compared by simulation according to the embodiment of the application.

FIG. 12 is a schematic diagram showing whether the PCC point power divergent generator set is off-grid or not when the series compensation degree is 85% according to the related arts and control method of the present disclosure compared by simulation in the embodiment of the application.

DETAILED DESCRIPTION OF EMBODIMENTS

Figure 1:
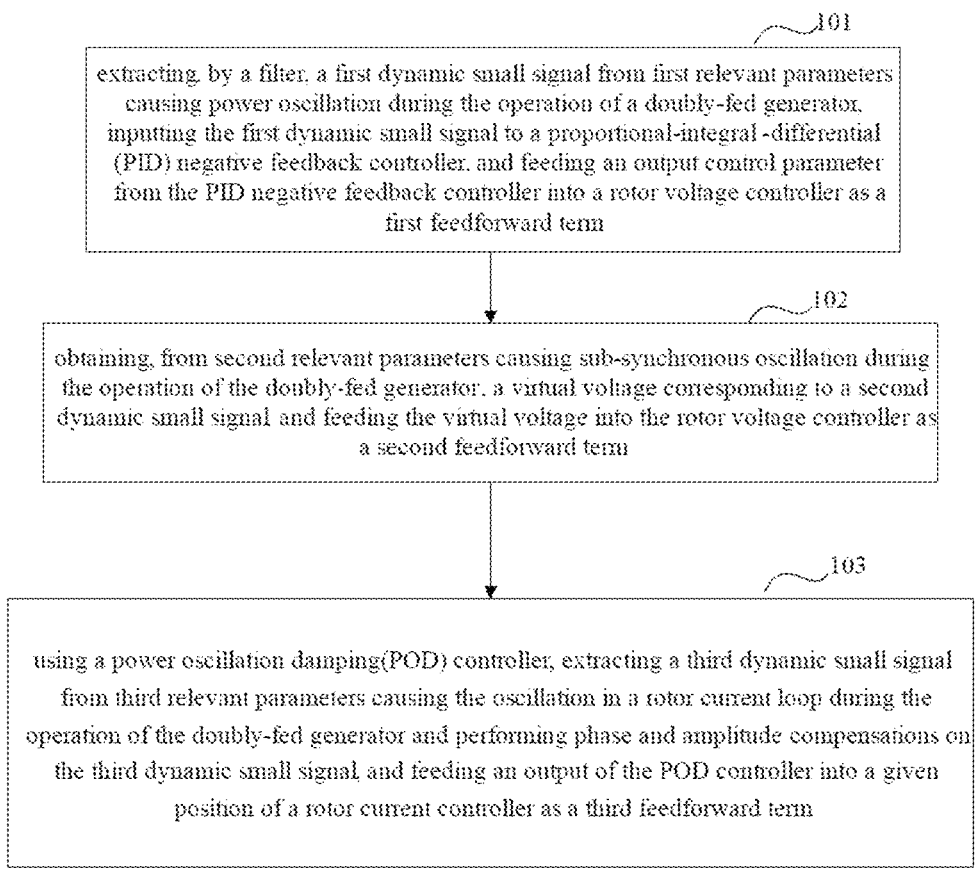
FIG. 1 is a flowchart of a method for controlling an oscillation damping caused by a series compensation for a wind power plant according to an embodiment of the present disclosure.

In order to further describe the technical solutions according to the embodiments of the present disclosure, the technical solutions are described in detail below combined with the accompanying drawings and the specific embodiments. Although operating steps of the method as described in the embodiments or the drawings are provided according to embodiments of the present disclosure, more or fewer operating steps may be included based on conventional or non-creative labor. Steps that logically do not have necessary causal relationship are not limited to be performed in an order according to an embodiment of the present disclosure. During the actual processing or control device execution, the method may be performed in an order described in the embodiments or shown in the drawings or performed in parallel.

In the present disclosure, on the basis of studying the characteristics of the oscillation caused by series compensation and weak grid impedance for a transmission network of a wind power plant, an analysis for a small signal model for a doubly-fed wind power generator is performed, and a scheme for controlling damping in an active manner based on an analysis for a small signal is applied to implement the suppression in power oscillation of the doubly-fed generator and contribute damping to the power grid, such that the voltage oscillation and frequency oscillation of the power grid can be convergent and return to a stable state.

Reference is made to FIG. 1, which is a flowchart of a method for controlling an oscillation damping caused by a series compensation for a wind power plant according to an embodiment of the present disclosure. The method includes the following steps 101 to 103.

In step 101, a filter extracts a first dynamic small signal from first relevant parameters causing power oscillation during the operation of a doubly-fed generator. The first dynamic small signal is input to a proportional-integral-differential (PID) negative feedback controller, and an output control parameter from the PID negative feedback controller is fed into a rotor voltage controller as a first feedforward term.

The function of the filter is to extract the first dynamic small signal from the first relevant parameters causing the power oscillation. The PID negative feedback controller is configured to perform control with the first dynamic small signal being zero as a control target, and determine the output control parameter based on an output of the filter and the control target. The output control parameter is fed to the rotor voltage controller as the first feedforward term to suppress the power oscillation.

In step 102, a virtual voltage corresponding to the second dynamic small signal is obtained from the second relevant parameters causing sub-synchronous oscillation during the operation of the doubly-fed generator, and the virtual voltage is then fed to the rotor voltage controller as a second feedforward term.

The above-mentioned virtual voltage corresponding to the second dynamic small signal causing the sub-synchronous oscillation is fed to the rotor voltage controller as a feedforward term to suppress the sub-synchronous oscillation.

In step 103, a power oscillation damping (POD) controller extracts a third dynamic small signal from third relevant parameters causing the oscillation of a rotor current loop during the operation of the doubly-fed generator, and performs phase and amplitude compensations on the third dynamic small signal. Then the output of the POD controller is fed into a given position of a rotor current controller as a third feedforward term.

The function of the above-mentioned POD controller is to extract the third dynamic small signal from the third relevant parameters causing the oscillation of the rotor current loop, and feed into a given position of a rotor current controller so as to suppress the rotor current loop oscillation.

In the embodiments of the present disclosure, the rotor voltage is controlled by a filter and a power oscillation damping (POD) controller in a feedforward manner and a negative feedback manner, to suppress the power oscillation, the sub-synchronous oscillation and the rotor current loop oscillation, so as to solve the problems of unstable performance and complex solution schemes occurred in the control of grid resonance and oscillation caused by the switching of series compensated transmission devices at the end of the power grid by the existing wind power doubly fed generator set converter.

In one or more embodiments, the power oscillation damping (POD) controller includes a gain unit with a gain coefficient K, a washout filter, and at least one phase compensator. It should be noted that each of the gain unit, the washout filter and the at least one phase compensator is a software unit.

Figure 2:
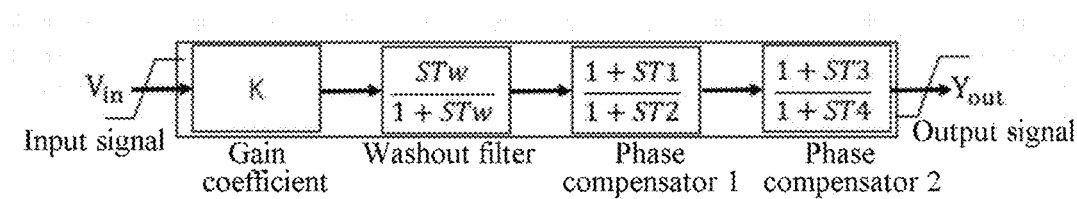
FIG. 2 is a schematic diagram showing a software structure of a POD controller according to an embodiment of the present disclosure.

The POD controller implements functions for filtering and extraction of a dynamic small signal and performing phase and amplitude compensations on the dynamic small signal. According to the analysis for frequency domain distribution of the small signal, a time constant Tw of the washout filter, and a first-order or second-order lead-lag phase compensator are set. Time constants T1, T2, T3 and T4 are set. A gain coefficient K for the dynamic small signal and a saturated limit of an input/output signal are set. The specific structure of the POD controller is as shown in FIG. 2. One or two of the phase compensators can be are designed according to the requirements, and the calculation formula in the phase compensator block diagram is the transfer function of the phase compensator.

The filter mentioned in this embodiment is the washout filter. The transfer function of the washout filter is as follows:

$$\frac{ST_w}{1+ST_w}$$

wherein S represents a differential operator, and Tw represents the set time constant.

Figure 3:
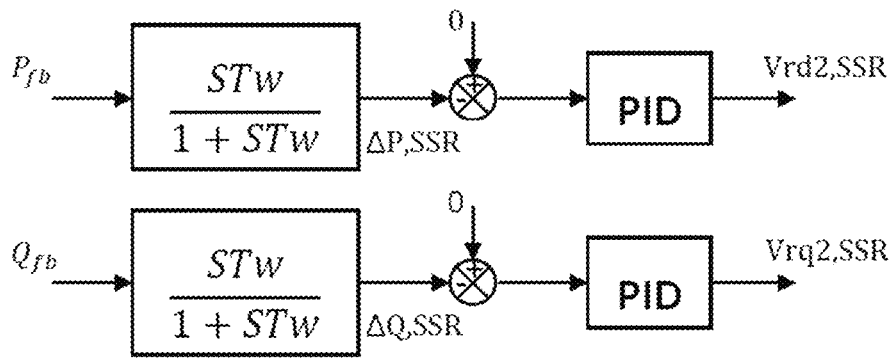
FIG. 3 is a schematic diagram showing processing a stator active power and a stator reactive power by filters according to an embodiment of the present disclosure.

In one or more embodiments, the first relevant parameters include a stator active power $P_{fb}$ for the d-axis (direct-axis) and a stator reactive power $Q_{fb}$ for the q-axis (quadrature axis). The rotor voltage controller includes a rotor voltage controller for the d-axis and a rotor voltage controller of the q-axis. As shown in FIG. 3, a dynamic small signal ΔP,SSR is extracted from the stator active power $P_{fb}$ by using a washout filter, and then is input to a corresponding PID negative feedback controller. The PID negative feedback controller obtains a corresponding output control parameter Vrd2,SSR from the dynamic small signal ΔP,SSR. The output control parameter Vrd2,SSR, which is fed to the rotor voltage controller for the d-axis as a first feedforward term, is added to a rotor voltage term outputted by a rotor inner current loop (i.e. a rotor voltage outputted by the rotor voltage controller). A dynamic small signal ΔQ,SSR is extracted from the stator reactive power $Q_{fb}$ by using a washout filter, and then is input to a corresponding PID negative feedback controller. The PID negative feedback controller obtains a corresponding output control parameter Vrq2,SSR from the first dynamic small signal ΔQ,SSR. The output control parameter Vrq2,SSR, which is fed to the rotor voltage controller for the q-axis as a first feedforward term, is added to the rotor voltage outputted by the rotor inner current loop.

The PID negative feedback controller may determine the output control parameter according to the following equation:

$$PID = K_p + \frac{K_i}{S} + \frac{K_d S}{T_f S + 1}$$

In the above equation, $K_p$ represents a scale factor, $K_i$ represents an integral coefficient, $K_d$ represents a differential coefficient, S represents a differential operator, and $T_f$ represents a time constant.

The second relevant parameters may include any of a rotor current and a stator current.

1) in a Case that the Second Relevant Parameters Include the Rotor Current

As an alternative implementation, in a case that the second relevant parameters include the rotor current, obtaining a virtual voltage corresponding to the second dynamic small signal from a second relevant parameters causing sub-synchronous oscillation during the operation of the doubly-fed generator, and feeding the virtual voltage to the rotor voltage controller as a second feedforward term includes: after extracting the second dynamic small signal from the rotor current by the POD controller and performing phase compensation on the second dynamic small signal, multiplying by a gain coefficient to obtain a virtual voltage corresponding to the second dynamic small signal and feeding it to the rotor voltage controller as the second feedforward term.

Figure 4:
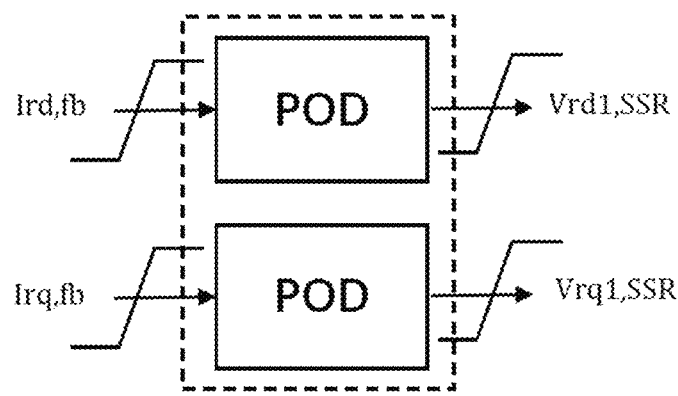
FIG. 4 is a schematic diagram showing processing a rotor current by a POD controller according to an embodiment of the present disclosure.

The rotor current includes a rotor current Ird,fb for the d-axis and a rotor current Irq,fb for the q-axis. As shown in FIG. 4, with respect to the rotor current Ird,fb, a power oscillation damping (POD) controller performs a extraction for a current small signal, phase compensation and amplitude compensation, and then multiply by a gain coefficient to obtain a virtual voltage Vrd1,SSR, and feeds the obtained the virtual voltage Vrd1,SSR to the rotor voltage controller for the d-axis as the second feedforward control term, which will be added to a rotor voltage term outputted from a rotor inner current loop. With respect to the rotor current Irq,fb, the power oscillation damping (POD) controller performs a extraction for a current small signal, phase compensation and amplitude compensation, and then multiply by a gain coefficient to obtain a virtual voltage Vrq1,SSR, and feeds the obtained the virtual voltage Vrq1,SSR to the rotor voltage controller for the q-axis as the dynamic feedforward control term, which will be added to a rotor voltage term outputted from a rotor inner current loop.

Figure 5:
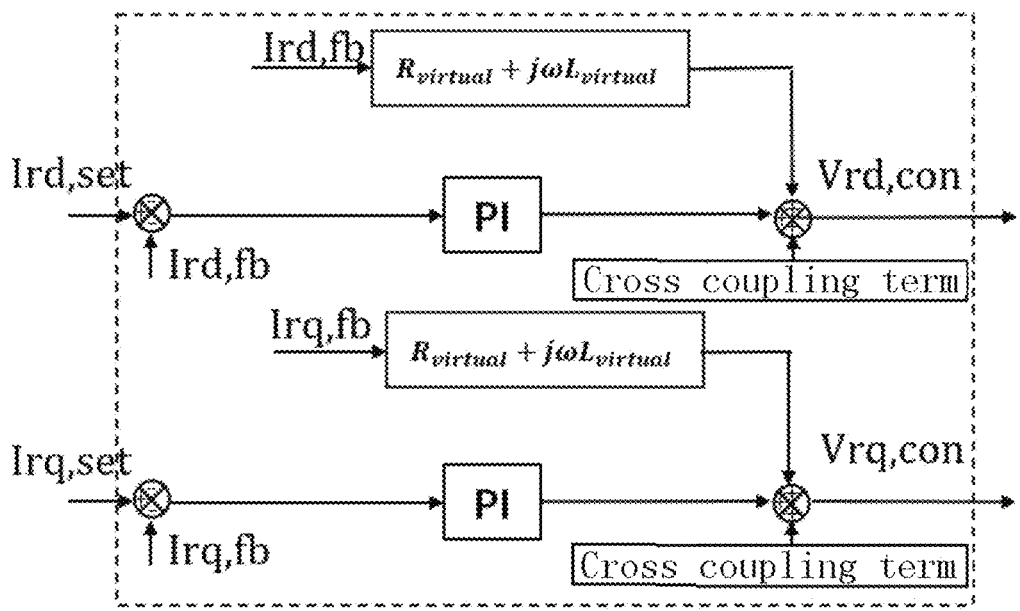
FIG. 5 is a schematic diagram showing multiplying a rotor current by a sum of a virtual resistance and a virtual impedance to obtain a virtual voltage according to an embodiment of the present disclosure.

As another implementation, in a case that the second relevant parameters include the rotor current, according to a second relevant parameters causing sub-synchronous oscillation during the operation of the doubly-fed generator, obtaining a virtual voltage corresponding to the second dynamic small signal and feeding it to the rotor voltage controller as a second feedforward term, including: the rotor current is multiplied by a sum of a virtual resistance and a virtual impedance to obtain a virtual voltage corresponding to the second dynamic small signal, and the virtual voltage is fed to an output terminal of the rotor current controller as the second feedforward term. The output terminal of the rotor current controller is connected to the rotor voltage controller. As shown in FIG. 5, a rotor current Ird,fb is multiplied by a sum of a virtual resistance $R_{virtual}$ and a virtual inductive reactance $j\omega L_{virtual}$ to obtain a virtual voltage corresponding to the second dynamic small signal, and the virtual voltage is fed to an output terminal of the rotor current controller for the d-axis and is added to a rotor voltage term of the output terminal of the rotor current controller for the d-axis. The output terminal of the rotor current controller for the d-axis is connected to the rotor voltage controller for the d-axis. A rotor current Irq,fb is multiplied by a sum of a virtual resistance $R_{virtual}$ and a virtual inductive reactance $j\omega L_{virtual}$ to obtain a virtual voltage corresponding to the second dynamic small signal, and the virtual voltage is fed to an output terminal of the rotor current controller for the q-axis and is added to a rotor voltage of the output terminal of the rotor current controller for the q-axis.

2) in a Case that the Second Relevant Parameters Include the Stator Current

As an implementation, in a case that the second relevant parameters include the stator current, obtaining a virtual voltage corresponding to the second dynamic small signal from the second relevant parameters causing sub-synchronous oscillation during the operation of the doubly-fed generator, includes: after extracting the second dynamic small signal from the stator current by the POD controller and performing phase compensation, multiplying by a gain coefficient to obtain a virtual voltage corresponding to the second dynamic small signal.

Figure 6:
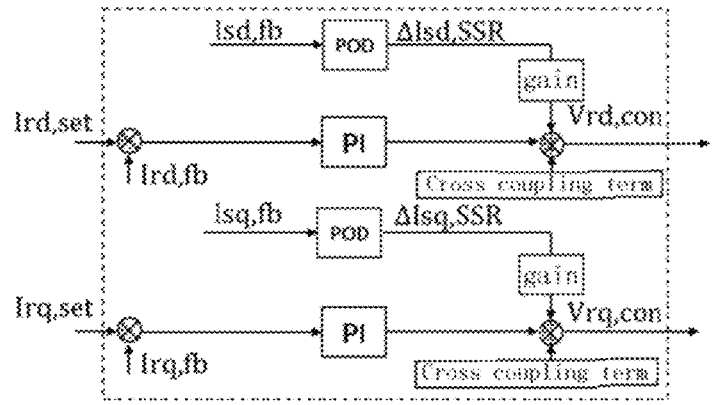
FIG. 6 is a schematic diagram showing processing a stator current by a POD controller according to an embodiment of the present disclosure.

The stator current includes a stator current Isd,fb for the d-axis and a stator current Isq,fb for the q-axis. As shown in FIG. 6, with respect to a stator current Isd,fb, a power oscillation damping (POD) controller performs a extraction for a current small signal, phase compensation and amplitude compensation to obtain a current small signal ΔIsd,SSR, and the obtained small stator current signal ΔIsd,SSR multiplied by the gain is fed into the output terminal of the rotor current controller for the d-axis as the second feedforward control term, which will be added to a rotor voltage term outputted from the rotor current controller for the d-axis. With respect to a stator current Isq,fb, a power oscillation damping (POD) controller performs a extraction for a current small signal, phase compensation and amplitude compensation to obtain a current small signal ΔIsq,SSR, and the obtained small stator current signal ΔIsq,SSR multiplied by the gain is fed into the output terminal of the rotor current controller for the q-axis as a dynamic feedforward control term, which will be added to a rotor voltage term outputted from the rotor current controller for the q-axis.

In one or more embodiments, the third relevant parameters include a rotor positive sequence voltage for the d-axis and a rotor positive sequence voltage for the q-axis. The rotor voltage controller includes a rotor voltage controller for the d-axis and a rotor voltage controller for the q-axis.

The small signal extraction and phase compensation are performed on the rotor positive sequence voltage, and a negative feedback loop is designed to feed into the given position of the rotor current inner loop to suppress the oscillation of the rotor current inner loop and accelerate the convergence of the current inner loop.

Figure 7:
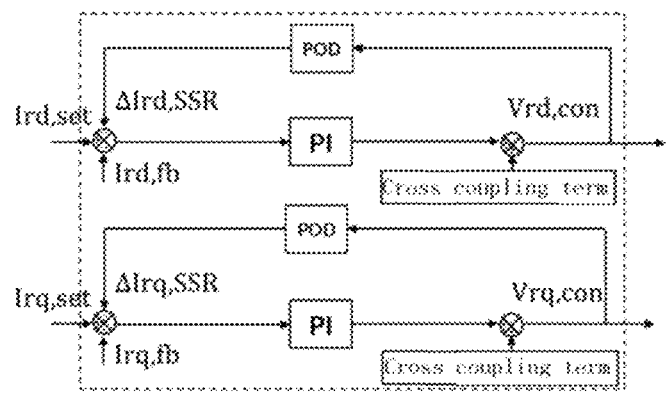
FIG. 7 is a schematic diagram showing that a POD controller processes a rotor positive sequence voltage and feeds into a given position of a rotor inner current loop through a negative feedback loop according to an embodiment of the present disclosure.

The specific implementation is as shown in FIG. 7. The power oscillation damping (POD) controller may extract a third dynamic small signal and performs a phase compensation with respect to the rotor positive sequence voltage Vrd,con for the d-axis, so as to obtain a current small signal ΔIrd,SSR for the d-axis and feed into a given position of the rotor current controller for the d-axis through a negative feedback loop. The power oscillation damping (POD) controller may extract a third dynamic small signal and performs phase compensation with respect to the rotor positive sequence voltage Vrq,con for the q-axis, so as to obtain a current small signal ΔIrq,SSR for the q-axis and feed into a given position of the rotor current controller through a negative feedback loop.

According to the solutions provided in the above embodiments of the present disclosure, the grid-connected converter of the wind power doubly-fed generator sets feeds the output signal of the damping filter to the rotor voltage controller as a dynamic feedforward control item to suppress sub-synchronous oscillation by utilizing a extraction of a rotor current small signal by a filter and performing phase compensation on the small signal.

A filter performs extraction and compensation on an active power and a reactive power of the stator, and the PQ small signal output by the filter passes through the PID negative feedback controller, and the control parameter output by the PID is fed into the rotor control voltage as a feedforward term to achieve suppression for power oscillation.

A rotor positive sequence voltage is extracted by the filter and multiplied by the gain coefficient by the compensator. The control signal is negatively fed into the given position of the rotor current loop. Through the rotor current forward channel closed loop, the rotor current loop oscillation is suppressed.

On the basis of the steady-state control described above, This embodiment can also calculate and obtain the sub-synchronous rotor control voltage steady-state feedforward term by multiplying the sub-synchronous voltage and the sub-synchronous slip rate by the stator-rotor turns ratio and feed the steady-state feedforward term into the rotor control voltage to perform sub-synchronous control in the feedforward control manner, which specifically includes: obtaining the sub-synchronous slip voltage and sub-synchronous slip frequency during the operation of the doubly-fed generator; feeding the fourth feedforward term obtained by multiplying the sub-synchronous slip voltage, sub-synchronous slip frequency and stator-rotor turns ratio coefficient into an output terminal of the rotor current controller, and the output terminal of the rotor current controller is connected to the rotor voltage controller.

In this embodiment of the present disclosure, the sub-synchronous slip voltage $V_{r,ffc,SSR}$ is calculated as a rotor voltage sub-synchronous steady-state feedforward part by calculating and identifying an amplitude $V_{s,SSR}$ of the sub-synchronous slip voltage and a sub-synchronous slip frequency $f_{s,SSR}$. The sub-synchronous slip voltage $V_{r,ffc,SSR}$ multiplied by a stator-rotor turns ratio $K_{ratio}$, as the fourth feedforward term, is fed into the rotor voltage controller as the fourth feedforward term for sub-synchronous control. The specific equations are as follows:

$$V_{r,ffc,SSR} = K_{ratio} * V_{s,SSR} * B;$$

$$B = 1 - j * \frac{R_r}{\omega_{SSR} * L_m} + \frac{L_{lr}}{L_m} - \frac{f_{r,mech}}{f_{s,SSR}} * \frac{L_r}{L_m}.$$

In the above equations, $R_r$ represents a resistance of the rotor, $L_{1r}$ represents a leakage inductance of the rotor, $L_r$ represents a self-inductance of the rotor, $L_m$ represents a mutual inductance of the doubly-fed generator, ωSSR represents $2\pi f_{s,SSR}$, and fr,mech represents a mechanical rotation speed of the rotor.

In the embodiments of the present disclosure, based on the steady-state control and the vibration control described above, the power angle vibration during the operation of the doubly-fed generator can further be suppressed in any of the following suppression manners.

1) a First Manner for Suppressing the Power Angle Oscillation Damping

The rotor voltage controller obtains a rotor voltage based on the first feedforward term, the second feedforward term and the output of the rotor current controller. The rotor voltage includes a rotor voltage for the d-axis and a rotor voltage for the q-axis. The rotor voltage is input to a phase locked loop (PLL), and after compensating for the phase and amplitude of the power component of the first dynamic small signal, it is multiplied by a gain coefficient and fed into an angular frequency integrator of the PLL. The corresponding power angle is calculated by using the PLL.

Figure 8:
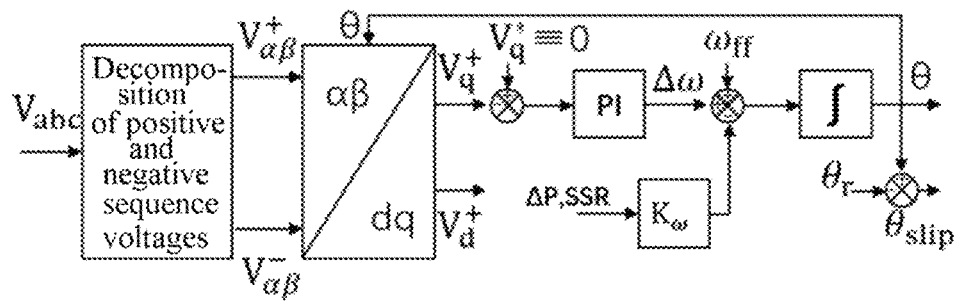
FIG. 8 is a schematic diagram showing a software structure for suppressing power angle oscillation according to an embodiment of the present disclosure.

According to a generator motion swing equation, the power component of the first dynamic small signal ΔP,SSR multiplied by the gain coefficient is fed to the angular frequency integrator of the PLL to suppress power angle oscillation and contribute damping to the power grid frequency oscillation. As shown in FIG. 8, a structure of the PLL damping compensator can be represented as the following equation:

$$J\frac{d\Delta\omega}{dt} = P_{Ref} - P_e - D^*(\omega_0 - \omega_g) - Kw^*(\omega_{Ref} - \omega_0)$$

In the above equation, J represents an inertia coefficient, $P_{ref}$ represents a set power, Pe represents an electromagnetic power, D represents a damping coefficient, $\omega_{ref}$ represents a reference angular frequency, $\omega_0$ represents an angular frequency of the doubly-fed generator, $\omega_g$ represents an angular frequency of the power grid, and Kω represents the gain coefficient.

In FIG. 8, Vabc represents the stator voltage of the doubly-fed generator. Vabc is decomposed by the positive and negative sequence components of the voltage to obtain a positive sequence voltage $V_{\alpha\beta}^+$ and a negative sequence voltage $V_{\alpha\beta}^-$, and a voltage $V_q^+$ for the q-axis and a voltage $V_d^+$ for the d-axis are obtained by performing a synchronous rotation coordinate system transform on the positive sequence voltage $V_{\alpha\beta}^+$ and negative sequence voltage $V_{\alpha\beta}^-$. The voltage $V_q^+$ for the q-axis is input to a proportional integral (PI) regulator for phase-locked loop regulation to obtain an angular frequency increment Δω. The angular frequency increment Δω is input to the angular frequency integrator of the PLL. Meanwhile, off represents a feedforward value of rated angular frequency. ΔP,SSR multiplied by the gain coefficient Kω is fed into the angular frequency integrator of the PLL for superposition processing, thereby obtaining a compensated power grid voltage orientation angle as a transformation angle of the synchronous rotation coordinate. θ represents an angle of the power grid. θr represents an electrical angle of the generator's rotor, and θslip represents an electrical angle of the rotor slip.

The above-mentioned manner for suppressing power angle oscillation provided by the embodiment of the application discloses extracting by a filter from the stator power, performing a phase compensation and multiplying by a gain droop coefficient, and feeding forward to a phase locked loop angular frequency integrator, thereby suppressing sub-synchronous power grid frequency power angle oscillation, which is equivalent to increasing the system damping.

2) a Second Manner for Suppressing the Power Angle Oscillation Damping

The rotor voltage controller can determine a rotor voltage based on the first feedforward term, the second feedforward term and the output of the rotor current controller. The rotor voltage comprises a rotor voltage for the d-axis and a rotor voltage for the q-axis.

A stator active power and a reference active power are input to a power controller. A power error increment corresponding to the angular frequency change is processed by an inertia device and a filter, and then fed into the power controller through a negative feedback loop.

The rotor voltage is input to a PLL. An output of the power controller is fed into an angular frequency integrator of the PLL, and the PLL calculates a voltage angle of the power grid.

Figure 9:
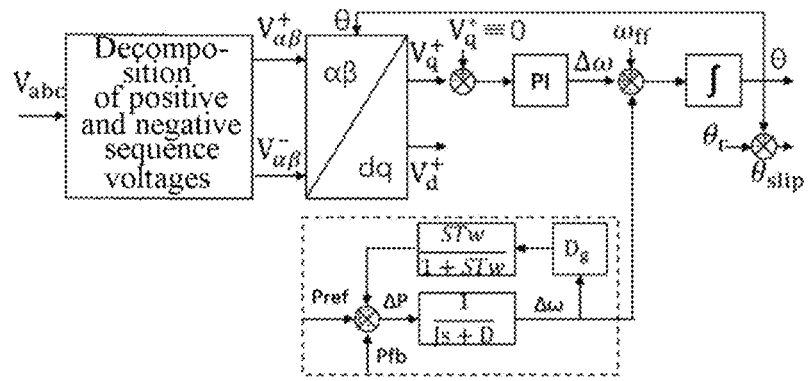
FIG. 9 is a schematic diagram showing a software structure for suppressing power angle oscillation according to another embodiment of the present disclosure.

As shown in FIG. 9, a stator active power Pfb and a reference active power Pref are input to a power controller to obtain a power error increment ΔP. The power error increment ΔP is input to an inertia device with a transfer function expressed as $$\frac{1}{Js + D}$$

where J represents an inertia coefficient, S represents a differential operator, and D represents a damping coefficient, to obtain an angular frequency increment Δω. The $$\frac{ST_w}{1 + ST_w}$$

in the FIG. 9 represents a transfer function of a washout filter. The angular frequency increment Δω is multiplied by an angular frequency deviation feedback gain coefficient Dg, and a product of Δω and Dg is input to the washout filter. An output of the washout filter is fed to the power controller in a negative feedback manner to suppress frequency oscillation.

The above solutions according to the present disclosure can be applied to a wind power generation system. The wind power generation system includes a doubly-fed generator and a converter system. The present disclosure can be applied a scenario in which a series capacitor used for compensating an impedance of a power grid with an end connected to a wind power plant results in sub-synchronous oscillation and super synchronous oscillation.

Figure 10:
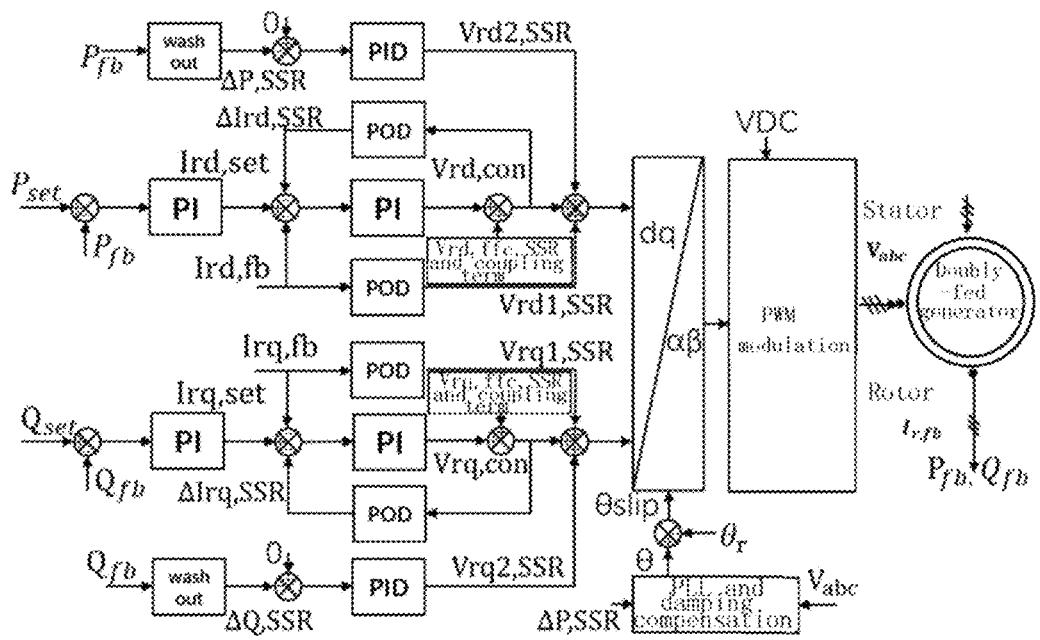
FIG. 10 is a schematic diagram showing overall control for controlling an oscillation damping caused by a series compensation for a wind power plant according to an embodiment of the present disclosure.

As shown in FIG. 10, which is a schematic diagram showing overall control of the method for controlling an oscillation damping caused by a series compensation for a wind power plant according to an embodiment of the present disclosure. The controlling method includes control on parameters for the d-axis and control on parameters for the q-axis.

1) Controlling for Parameters of the d-Axis

A washout filter extracts the dynamic small signal ΔP,SSR from the stator active power $P_{fb}$. The dynamic small signal ΔP,SSR is input to a corresponding PID negative feedback controller. An output control parameter determined by the PID negative feedback controller is fed forward to the rotor voltage controller for the d-axis.

A difference between the set active power $P_{set}$ and the stator active power Pb is input to a PI regulator to obtain the set current Ird,set. The set current Ird,set is input to the given position of the rotor inner current loop for the d-axis.

A POD controller extracts a current small signal from the rotor current Ird,fb, performs phase and amplitude compensations on the current small signal, multiplies by a gain coefficient to obtain a virtual voltage. The virtual voltage is fed forward to the rotor voltage controller for the d-axis.

A POD controller extracts a third dynamic small signal from the rotor positive sequence voltage Vrd,con for the d-axis, performs phase compensation on the third dynamic small signal to obtain the current small signal ΔIrd,SSR. The current small signal ΔIrd,SSR is fed into the given position of the rotor inner current loop for the d-axis through a negative feedback loop.

The set current Ird, set, the rotor current Ird,fb, and the current small signal ΔIrd,SSR fed through a negative feedback loop are accumulated to obtain an input error of the rotor current controller. The input error is processed by a PI regulator. The processed input error, the rotor sub-synchronous slip voltage Vrd,ffc,SSR and a coupling parameter for the d-axis are accumulated to obtain the rotor positive sequence voltage Vrd,con for the d-axis. The rotor positive sequence voltage Vrd,con is input to the rotor voltage controller for the d-axis. The rotor voltage controller determines a rotor voltage for the d-axis based on the first feedforward term, the second feedforward term and the rotor positive sequence voltage Vrd,con for the d-axis.

2) Controlling for Parameters of the q-Axis

A washout filter extracts the dynamic small signal ΔQ,SSR from the stator reactive power $Q_{fb}$. The dynamic small signal ΔQ,SSR is input to a corresponding PID negative feedback controller. An output control parameter determined by the PID negative feedback controller is fed forward to the rotor voltage controller for the q-axis.

A difference between the set reactive power Qset and the stator reactive power $Q_{fb}$ is input to a PI regulator to obtain the set current Irq,set. The set current Irq,set is input to the given position of the rotor inner current loop for the q-axis.

A POD controller extracts a current small signal from the rotor current Irq,fb, performs phase and amplitude compensations on the current small signal, multiplies the current small signal subjected to phase compensation and amplitude compensation by a gain coefficient to obtain a virtual voltage. The virtual voltage is fed forward to the rotor voltage controller for the q-axis.

A POD controller extracts a third dynamic small signal from the rotor positive sequence voltage Vrq,con for the q-axis, performs phase compensation on the third dynamic small signal to obtain the current small signal ΔIrq,SSR. The current small signal ΔIrq,SSR is fed into the given position of the rotor inner current loop for the q-axis through a negative feedback loop.

Subtraction is performed on the set current Irq,set, the rotor current Irq,fb, and the current small signal ΔIrq,SSR fed through a negative feedback loop to obtain an input error of the rotor current controller. The input error is processed by a PI regulator. The processed input error, the rotor sub-synchronous slip voltage Vrd,ffc,SSR and a coupling parameter for the d-axis are accumulated to obtain the rotor positive sequence voltage Vrq,con for the q-axis. The rotor positive sequence voltage Vrq,con is input to the rotor voltage controller for the q-axis. The rotor voltage controller determines a rotor voltage for the q-axis based on the first feedforward term, the second feedforward term and the rotor positive sequence voltage Vrq,con for the q-axis.

An objective of the present disclosure is to solve the problems of unstable performance and complex solution scheme for controlling a resonance oscillation of a power grid caused by switching transmission devices for series compensation at the end of the power grid by the converter of the existing wind power doubly-fed generator set. According to the method for controlling an oscillation damping caused by a series compensation for a wind power plant in an embodiment of the present disclosure, the oscillation component filter and active damping controller based on a small signal model are adopted. It is required to select active power, reactive power and rotor current as control inputs for the damping controller, and the control point fed by the output of the damping controller is the output point of the rotor current loop, i.e., the output point of the synchronous coordinate system of a rotor voltage. At the same time, the damping control of the an active power small signal needs be applied to the phase-locked loop integrator for the phase compensation and the power angle damping, and at the same time, a small signal of a rotor positive sequence voltage is negatively fed into a given input point of the rotor current loop to make the current inner loop quickly enter a stable state. The above-mentioned extraction of a small signal, feedforward and feedback methods work together to solve the problems of series compensation resonance of a weak power grid and suppression for oscillation of a doubly-fed generator, contribute the damping to the power grid to stabilize the power grid, and overcome the problem of a poor adaptability of wind power generation applied to a weak power grid with sub-synchronous oscillation, thus greatly expanding and improving the control performance of wind power generation grid-connected converter. As for negative sequence sub-synchronous frequency components, the negative sequence equivalent resistance is always positive, which will not cause negative resistance damping effect, so the influence of negative sequence can be ignored. In the present disclosure, unless otherwise specified, a positive sequence power and positive sequence voltage and current are used for processing signal and controlling oscillation.

The control scheme of present disclosure is verified by the simulation software PSCAD which provides a simulation environment for a wind power plant and a transmission power grid model. PSCAD power grid model is built according to an actual structure and parameters of a 300 MW a wind power plant power grid, and test cases are designed according to an actual operation state of the power grid. The unexpected addition of series compensation capacitance in the simulated power grid makes a wind power generator set enter a sub-synchronous resonance state, which is used to verify and evaluate the operation performance of a doubly-fed wind power generator set under these power grid parameters. A simulation result indicates that, with the method for suppressing sub-synchronous damping oscillation, power oscillation of the doubly-fed generator, voltage oscillation of the power grid, and frequency oscillation of the power grid can be converged rapidly, so that the wind power plant operates continuously and stably. The error of power control accuracy is less than 1%. The power oscillation degree of a doubly-fed converter with other methods for controlling sub-synchronous oscillation will be alleviated, but it will continue to oscillate, and the power oscillation error is greater than 3%. The simulation waveforms of PSCAD are shown in FIG. 11.

The sub-synchronous power grid is controlled with test cases with different series compensation degrees (25%, 45%, 65% and 85%). With the control method provided by the present disclosure, the power grid oscillation quickly resumes stable and normal operation, and other sub-synchronous oscillation control scheme can be controlled when the series compensation degree is 25%. With the series compensation degree increasing to 45%, the doubly-fed generator cannot stably control the rapid divergence and off-grid of a wind generating set, so it has no operational capability. The simulation waveforms of PSCAD are shown in FIG. 12.

Figure 13:
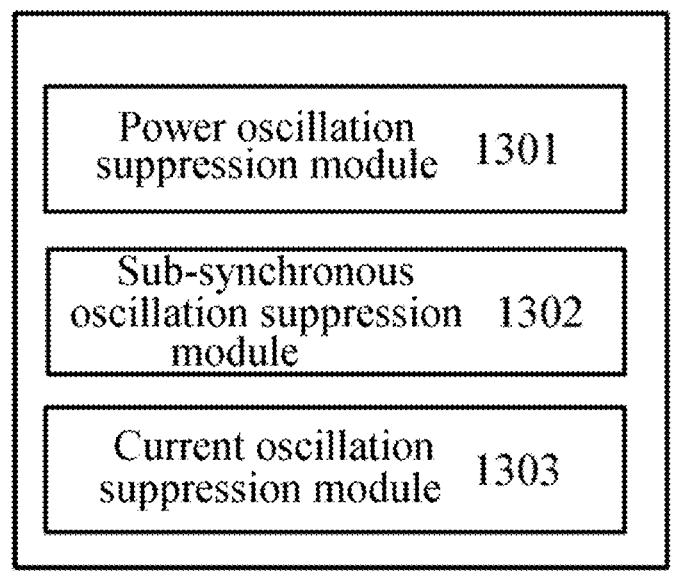
FIG. 13 is a schematic structural diagram of an apparatus for controlling an oscillation damping caused by a series compensation for a wind power plant according to an embodiment of the present disclosure.

Based on the same inventive concept, an apparatus for controlling oscillation caused by series compensation for a wind power plant is further provided according to the present disclosure. As shown in FIG. 13, the apparatus includes a power oscillation suppression module 1301, a sub-synchronous oscillation suppression module 1302, and a current oscillation suppression module 1303.

The power oscillation suppression module 1301 is configured to extract, by a filter, a first dynamic small signal from first relevant parameters causing power oscillation during the operation of a doubly-fed generator, input the first dynamic small signal to a proportional-integral-differential (PID) negative feedback controller, and feed an output control parameter from the PID negative feedback controller into a rotor voltage controller as a first feedforward term.

The sub-synchronous oscillation suppression module 1302 is configured to obtain, from second relevant parameters causing sub-synchronous oscillation during the operation of the doubly-fed generator, a virtual voltage corresponding to a second dynamic small signal, and feed the virtual voltage into the rotor voltage controller as a second feedforward term.

The a current oscillation suppression module 1303 is configured to extract a third dynamic small signal from third relevant parameters causing the oscillation in a rotor current loop during the operation of the doubly-fed generator and perform phase and amplitude compensations on the third dynamic small signal, and feed an output of the POD controller into a given position of a rotor current controller as a third feedforward term.

In one or more embodiments, the device further includes a steady-state feedforward module.

The steady-state feedforward module is configured to acquire a sub-synchronous slip voltage and a sub-synchronous slip frequency during the operation of the doubly-fed generator, multiply the sub-synchronous slip voltage, the sub-synchronous slip frequency and a stator-rotor turn ratio of the doubly-fed generator to obtain a fourth feedforward term, and feed the fourth feedforward term to an output terminal of the rotor current controller, wherein the output terminal of the rotor current controller is connected to the rotor voltage controller.

In one or more embodiments, the device further includes a first power angle oscillation suppression module.

The first power angle oscillation suppression module is configured to: obtain a rotor voltage by the rotor voltage controller based on the first feedforward term, the second feedforward term and an output of the rotor current controller, wherein the rotor voltage comprises a rotor voltage for a d-axis and a rotor voltage for a q-axis; and input the rotor voltage to a phase locked loop (PLL), perform phase and amplitude compensations on a power component of the first dynamic small signal, multiply the power component subjected to the phase and amplitude compensations by a gain coefficient and feed into an angular frequency integrator of the PLL, and calculate corresponding grid voltage angle by using the PLL.

In one or more embodiments, the second relevant parameters include a rotor current or a stator current.

In one or more embodiments, the second relevant parameters include the rotor current, and the obtaining the virtual voltage corresponding to the second dynamic small signal from the second relevant parameters causing sub-synchronous oscillation during the operation of the doubly-fed generator and feeding the virtual voltage into the rotor voltage controller as the second feedforward term comprises: extracting the second dynamic small signal from the rotor current by the POD controller, performing phase compensation on the second dynamic small signal and multiplying by a gain coefficient to obtain the virtual voltage corresponding to the second dynamic small signal, and feeding the obtained virtual voltage into the rotor voltage controller as the second feedforward term; or multiplying the rotor current by a sum of a virtual resistance and a virtual impedance to obtain the virtual voltage corresponding to the second dynamic small signal, and feeding the obtained virtual voltage into an output terminal of the rotor current controller as the second feedforward term, wherein the output terminal of the rotor current controller is connected to the rotor voltage controller.

In one or more embodiments, the device further includes a second power angle oscillation suppression module. The second power angle oscillation suppression module is configured to: obtain a rotor voltage by the rotor voltage controller based on the first feedforward term, the second feedforward term and an output of the rotor current controller, wherein the rotor voltage comprises a rotor voltage for a d-axis and a rotor voltage for a q-axis; input a stator active power and a reference active power to a power controller, and process by an inertia device and a filter the obtained corresponding angular frequency change and feed into the power controller through a negative feedback loop; and input the rotor voltage to a phase-locked loop (PLL), feed an output of the power controller to an angular frequency integrator of the PLL, and calculate by the PLL a corresponding voltage angle of a power grid.

In one or more embodiment, the filter is a washout filter and a transfer function of the washout filter is expressed as:

$$\frac{ST_w}{1 + ST_w}$$

wherein S represents a differential operator, and Tw represents a predetermined time constant.

In one or more embodiment, the first relevant parameters comprise a stator active power $P_{fb}$ for a d-axis and a stator reactive power $Q_{fb}$ for a q-axis, and the rotor voltage controller comprises a rotor voltage controller for the d-axis and a rotor voltage controller for the q-axis.

In one or more embodiment, the third relevant parameters comprise a rotor positive sequence voltage for a d-axis and a rotor positive sequence voltage for a q-axis, and the rotor voltage controller comprises a rotor voltage controller for the d-axis and a rotor voltage controller for the q-axis.

In one or more embodiment, the POD controller comprises a gain unit with a gain coefficient K, a washout filter, and at least one phase compensator.

After describing the method and the apparatus for controlling an oscillation damping caused by a series compensation for a wind power plant according to the exemplary embodiments of the present disclosure, a device for controlling an oscillation damping caused by a series compensation for a wind power plant according to another exemplary embodiment of the present application will be described.

In some embodiments, the device for controlling an oscillation damping caused by a series compensation for a wind power plant according to the present disclosure includes at least one processor and at least one memory. The at least one memory has a program stored thereon, and the program, when being executed by the at least one processor, cause the processor to implement the method for controlling an oscillation damping caused by a series compensation for a wind power plant according to the present disclosure.

The device for controlling oscillation caused by series compensation for a wind power plant according to an embodiment of the present disclosure is described below with reference to FIG. 14. The device for controlling oscillation caused by series compensation for a wind power plant shown in FIG. 4 is only an example, and should not impose any restrictions on the function and the application scope of the embodiments of the present disclosure.

Figure 14:
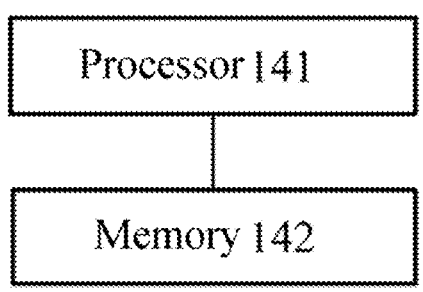
FIG. 14 is a schematic structural diagram of a device for controlling an oscillation damping caused by a series compensation for a wind power plant according to an embodiment of the present disclosure.

As shown in FIG. 14, the device for controlling an oscillation damping caused by a series compensation for a wind power plant may be implemented in the form of a general electronic device. Components of the electronic device may include, but are not limited to, at least one processor 141 and at least one memory 142 as described above.

The memory 142 may include a readable medium in a form of a volatile memory, such as a random access memory (RAM) and/or a cache memory and may further include a read only memory (ROM).

The memory 142 may further include a program/utility including a group (at least one) of program modules. The program module includes but is not limited to: an operating system, one or more applications, other program modules and program data. Each or a combination of these examples may include an implementation of a network environment.

The device for controlling an oscillation damping caused by a series compensation for a wind power plant may communicate with one or more one or more external devices (such as, a keyboard and a pointing device), and may further communicate with one or more devices that enable a user to interact with the device for controlling an oscillation damping caused by a series compensation for a wind power plant, and/or with any device (such as a router and a modem) that enables the device for controlling an oscillation damping caused by a series compensation for a wind power plant to communicate with one or more other electronic devices. The communication may be performed through an input/output (I/O) interface.

A wind power generation system is further provided according to an embodiment of the present disclosure. The wind power generation system includes the apparatus for controlling an oscillation damping caused by a series compensation for a wind power plant according to the above embodiments, and a doubly-fed generator operating under control of the apparatus for controlling an oscillation damping caused by a series compensation for a wind power plant.

In some implementations, various aspects of the method for controlling an oscillation damping caused by a series compensation for a wind power plant according to the present disclosure may be implemented as a form of a program product including program codes. When the program product runs on a computer device, the program codes cause the computer device to perform the method for controlling an oscillation damping caused by a series compensation for a wind power plant according to various embodiments of the present disclosure that are described above in the specification.

The program product may be any combination of one or more readable media. The readable medium may be a readable signal medium or a readable storage medium. The computer readable storage medium may be but not limited to a system, an apparatus, or a device in an electronic, magnetic, optical, electromagnetic, infrared, or semi-conductive form, or any combination thereof. The readable storage medium may be but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof.

Although the preferred embodiments of the present disclosure are described, those skilled in the art may make additional changes and modifications to the embodiments once they know the basic creative concepts. Therefore, the claims are intended to be explained as including the preferred embodiments and all changes and modifications falling within the scope of the present disclosure.

Apparently, those skilled in the art can make various variations and modifications to the present disclosure without departing from the spirit and the scope of the present disclosure. Thus, if these variations and modifications of the present disclosure fall within the scope of the claims of the present disclosure and equivalent technologies thereof, the present disclosure is intended to include these variations and modifications.

The invention claimed is:

1. A method for controlling an oscillation damping caused by a series compensation for a wind power plant, wherein the method comprises:
    extracting, by a filter, a first dynamic small signal from first parameters causing power oscillation during the operation of a doubly-fed generator, inputting the first dynamic small signal to a proportional-integral-differential (PID) controller, and feeding an output control parameter from the PID controller into a rotor voltage controller as a first feedforward term;
    obtaining, from second parameters causing sub-synchronous oscillation during the operation of the doubly-fed generator, a virtual voltage corresponding to a second dynamic small signal, and feeding the virtual voltage into the rotor voltage controller as a second feedforward term;
    using a power oscillation damping (POD) controller, extracting a third dynamic small signal from third parameters causing an oscillation in a rotor current loop during the operation of the doubly-fed generator and performing phase and amplitude compensations on the third dynamic small signal, and feeding an output of the POD controller related to phase and amplitude-compensated third dynamic small signal into a given position of a rotor current controller as a third feedforward term.

2. The method according to claim 1, further comprising:
acquiring a sub-synchronous slip voltage and a sub-synchronous slip frequency during the operation of the doubly-fed generator;
multiplying the sub-synchronous slip voltage, the sub-synchronous slip frequency and a stator-rotor turn ratio to obtain a fourth feedforward term; and
feeding the fourth feedforward term into an output terminal of the rotor current controller, wherein the output terminal of the rotor current controller is connected to the rotor voltage controller.

3. The method according to claim 1, further comprising:
obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis; and
inputting the rotor voltage to a phase locked loop (PLL), performing phase and amplitude compensations on a power component of the first dynamic small signal, multiplying the power component subjected to the phase and amplitude compensations by a gain coefficient and feeding into an angular frequency integrator of the PLL, and calculating corresponding grid voltage angle by using the PLL.

4. The method according to claim 2, further comprising:
obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis; and
inputting the rotor voltage to a phase locked loop (PLL), performing phase and amplitude compensations on a power component of the first dynamic small signal, multiplying the power component subjected to the phase and amplitude compensations by a gain coefficient and feeding into an angular frequency integrator of the PLL, and calculating corresponding grid voltage angle by using the PLL.

5. The method according to claim 1, wherein the second parameters include a rotor current or a stator current.

6. The method according to claim 5, wherein the second parameters include the rotor current, and the obtaining the virtual voltage corresponding to the second dynamic small signal from the second parameters causing sub-synchronous oscillation during the operation of the doubly-fed generator and feeding the virtual voltage into the rotor voltage controller as the second feedforward term comprises:
extracting the second dynamic small signal from the rotor current by the POD controller, performing phase compensation on the second dynamic small signal and multiplying by a gain coefficient to obtain the virtual voltage corresponding to the second dynamic small signal, and feeding the obtained virtual voltage into the rotor voltage controller as the second feedforward term; or
multiplying the rotor current by a sum of a virtual resistance and a virtual impedance to obtain the virtual voltage corresponding to the second dynamic small signal, and feeding the obtained virtual voltage into an output terminal of the rotor current controller as the second feedforward term, wherein the output terminal of the rotor current controller is connected to the rotor voltage controller.

7. The method according to claim 1, further comprising:
obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis;
inputting a stator active power and a reference active power to a power controller, and processing by an inertia device and a filter the obtained corresponding angular frequency change and feeding into the power controller through a negative feedback loop; and
inputting the rotor voltage to a phase-locked loop (PLL), feeding an output of the power controller to an angular frequency integrator of the PLL, and calculating by the PLL a corresponding voltage angle of a power grid.

8. The method according to claim 2, further comprising:
obtaining a rotor voltage by the rotor voltage controller based on the first feedforward term, the second feedforward term and an output of the rotor current controller, wherein the rotor voltage comprises a rotor voltage for a d-axis and a rotor voltage for a q-axis;
inputting a stator active power and a reference active power to a power controller, and processing by an inertia device and a filter the obtained corresponding angular frequency change and feeding into the power controller through a negative feedback loop; and
inputting the rotor voltage to a phase-locked loop (PLL), feeding an output of the power controller to an angular frequency integrator of the PLL, and calculating by the PLL a corresponding voltage angle of a power grid.

9. The method according to claim 1, wherein the filter is a washout filter and a transfer function of the washout filter is expressed as:

$$\frac{ST_w}{1+ST_w}$$

wherein S represents a differential operator, and Tw represents a predetermined time constant.

10. The method according to claim 1, wherein the first parameters comprise a stator active power $P_{fb}$ for a d-axis and a stator reactive power $Q_{fb}$ for a q-axis, and the rotor voltage controller comprises a rotor voltage controller for the d-axis and a rotor voltage controller for the q-axis.

11. The method according to claim 1, wherein the third parameters comprise a rotor positive sequence voltage for a d-axis and a rotor positive sequence voltage for a q-axis, and the rotor voltage controller comprises a rotor voltage controller for the d-axis and a rotor voltage controller for the q-axis.

12. The method according to claim 1, wherein the POD controller comprises a gain unit with a gain coefficient K, a washout filter, and at least one phase compensator.

13. The method according to claim 10, wherein the POD controller comprises a gain unit with a gain coefficient K, a washout filter, and at least one phase compensator.

14. An apparatus for controlling an oscillation damping caused by a series compensation for a wind power plant, wherein the apparatus comprises:
a power oscillation suppression module, configured to extract, by a filter, a first dynamic small signal from first parameters causing power oscillation during the operation of a doubly-fed generator, input the first dynamic small signal to a proportional-integral-differential (PID) controller, and feed an output control parameter from the PID controller into a rotor voltage controller as a first feedforward term;

a sub-synchronous oscillation suppression module, configured to obtain, from second parameters causing sub-synchronous oscillation during the operation of the doubly-fed generator, a virtual voltage corresponding to a second dynamic small signal, and feed the virtual voltage into the rotor voltage controller as a second feedforward term; and a current oscillation suppression module, configured to extract a third dynamic small signal from third parameters causing an oscillation in a rotor current loop during the operation of the doubly-fed generator and perform phase and amplitude compensations by a power oscillation damping (POD) controller, and feed an output of the POD controller related to phase and amplitude-compensated third dynamic small signal into a given position of a rotor current controller as a third feedforward term.

15. A wind power generation system, comprising:

the apparatus for controlling an oscillation damping caused by a series compensation for a wind power plant according to claim 14; and a doubly-fed generator configured to operate under control of the apparatus for controlling an oscillation damping caused by a series compensation for a wind power plant.

* * * * *